United States Patent [19]

Geddes et al.

[11] 4,027,656
[45] June 7, 1977

[54] SULPHUR MELTING APPARATUS AND METHOD

[75] Inventors: Robert S. Geddes; William W. Chalmers; Ross R. Williams, all of Calgary, Canada

[73] Assignee: Canadian Occidental Petroleum, Ltd., Calgary, Canada

[22] Filed: July 11, 1975

[21] Appl. No.: 595,329

[52] U.S. Cl. .................. 126/343.5 A; 23/308 S; 23/280; 432/97
[51] Int. Cl.² .................................. F24H 1/00
[58] Field of Search ............ 126/343.5 R, 343.5 A; 432/97; 219/421; 23/308 S, 267 S, 280; 423/578

[56] References Cited

UNITED STATES PATENTS

| | | | |
|---|---|---|---|
| 1,713,543 | 5/1929 | Machlet | 432/97 |
| 2,149,373 | 3/1939 | Vincent et al. | 23/267 S |

FOREIGN PATENTS OR APPLICATIONS

| | | | |
|---|---|---|---|
| 175,659 | 8/1953 | Austria | 126/343.5 A |

*Primary Examiner*—John J. Camby
*Assistant Examiner*—Larry I. Schwartz
*Attorney, Agent, or Firm*—William G. Lane; Edward A. Grannen, Jr.

[57] ABSTRACT

Apparatus for melting sulphur, including an upstanding tube, or tubes, each being adapted to receive solid sulphur in its top open end and each having a heating jacket therearound. The sulphur along the tube wall is melted and caused to flow along the wall surface and out of the lower end of the tube. A heated plate is spaced from the lower end of the tube whereby flow of the melted sulphur from the tube is permitted, additional sulphur being melted by the plate, and flow of solid sulphur is stopped. The plate is sloped to permit the flow of the liquid sulphur into a trough for flow for storage or use elsewhere.

A method of melting sulphur by which solid sulphur is fed into the upper end of a vertical tube. The tube is heated to melt the sulphur against the tube wall. A film of melted sulphur is caused to flow down the wall and out of the tube bottom onto a sloping, heated plate and into a trough for removal or use. The flow of solid sulphur is stopped by the plate.

15 Claims, 5 Drawing Figures

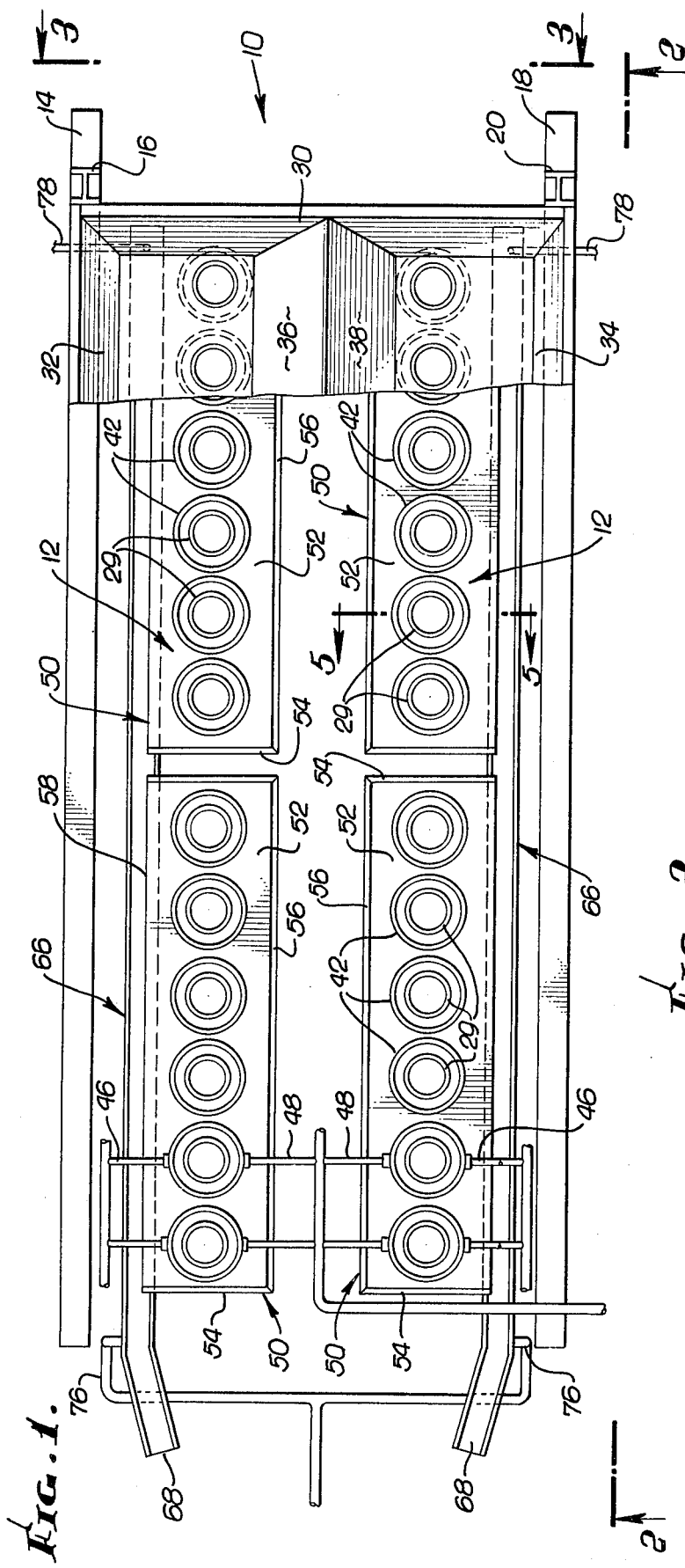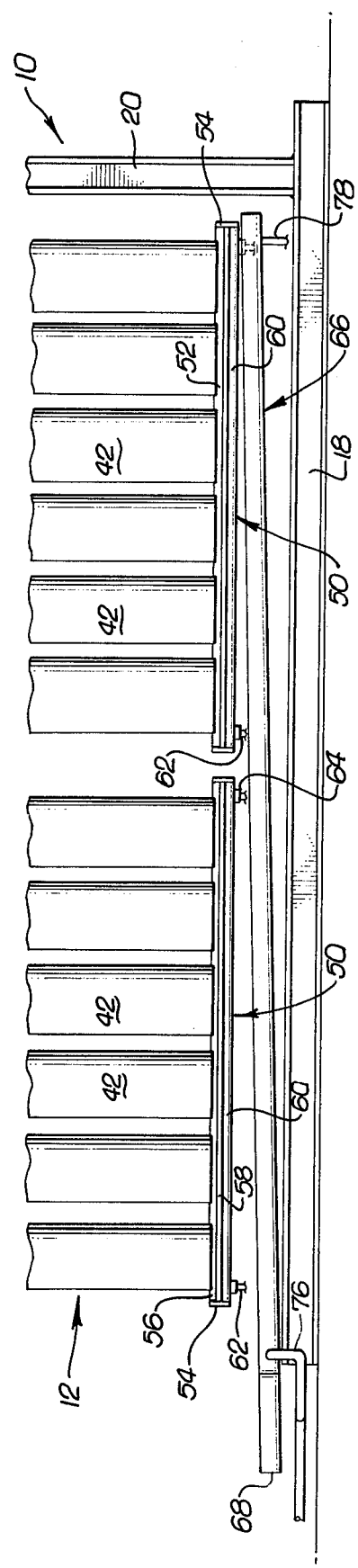

SULPHUR MELTING APPARATUS AND METHOD

BACKGROUND OF THE INVENTION

The invention relates to the melting of thermo-plastic materials and, more particularly, relates to an improved apparatus and method for recovering liquid sulphur from crude elemental sulphur in rock, pellet, granular, flaked, slated or powdered form. In the prior art, sulphur has been typically melted in tanks, vats or pits having heating coils. A continuous supply of coarsely divided sulphur was fed into the melting containers and the resultant slurry was vigorously agitated at a temperature above the melting point of sulphur to accelerate the remelt rate. These melting devices and methods were inefficient and required substantial labor for operation and maintenance, and required considerable capital investment.

In these devices problems were caused by entrained moisture in the solid sulphur which resulted in violent foaming, reduced capacity, and frequent shutdown time was necessary to remove solid rock-like sediments from the melting devices. Because these prior art methods relied solely on applying heat to the solid indirectly through the liquid, a low heat transfer coefficient, U, existed and resulted in the requirement for mechanical agitation of the solid-liquid sulphur in order to operate at practical rates. The present invention eliminates the need for agitation equipment, the violent foaming, frequent cleaning, and the uneconomical heat transfer operation.

Other prior art devices have structures within the solid and liquid sulphur areas that increase resistance to solid and liquid flow. Such devices also permit some solid sulphur to be discharged with the liquid.

SUMMARY OF THE INVENTION

According to the present invention, solid sulphur is gravity fed into one or more heated vertical sulphur melt tubes, the tubes being fed from a hopper. The tubes may be heated electrically, with a hot fluid or preferably with steam. The size of the coarsely broken sulphur is limited by the size of the tubes. The maximum number of tubes which may be fed by one hopper is of the order of 10 to 30.

The solid sulphur is maintained within the tubes by means of an external heated plate at their lower ends, spaced from the tubes so as to permit the outward flow of melted sulphur. The overburden weight of the sulphur within the hopper forces the sulphur into the tubes and against the heated walls of the tubes. The sulphur in contact with the heated walls immediately melts forming a film of liquid sulphur flowing downwardly along the wall surface and out through the controlled restrictions formed by the tubes and the heated plates, and then into a heated trough in which the sulphur flows to liquid storage or to offside loading.

In the present invention an optimum overall heat transfer coefficient is maintained for melting the sulphur for the full length of each tube. The arrangement of heating the tube wall along which the melted sulphur flows optimizes the surface transfer area in that the sulphur upon melting immediately drains from the heat transfer surface, and because of the effective self-applied overburden pressure, the solid sulphur is held in continuous contact with the heat transfer surface. By this arrangement a steady state equilibrium exists whereby only a thin liquid sulphur film is established on the tube wall surface. The resistance to heat transfer offered by the thin film is significantly less than that occurring when solid sulphur is in a slurry or suspension of heated liquid sulphur, as occurred in the prior art.

The omission of structure within the heating tubes and their discharge ends improves solid and liquid sulphur flow and the melting rate. This omission also permits all surfaces below the hopper to be heated well above the sulphur melting point.

Vibrating equipment may be positioned on the hopper or other parts of the remelt assembly to aid in the flow of sulphur into the tubes.

Accordingly it is an object of the invention to provide an improved apparatus and method for melting sulphur.

It is another object of the invention to provide an apparatus and method for melting sulphur in which the heat transfer coefficient is significantly increased and in which the cost of the equipment is substantially decreased.

It is still another object of the invention to provide an apparatus and method in which the simplicity of the apparatus and its low cost permits maximum design flexibility and optimum sizing of the equipment.

It is a further object of the invention to provide an apparatus and method for melting sulphur, as referred to in the previous paragraphs, in which the production costs are greatly reduced by elimination of costly mechanical equipment, and by very low maintenance costs.

It is a still further object of the invention to provide apparatus, as referred to in the previous paragraphs, in which the flow of the liquid sulphur therefrom is controlled so that the apparatus can operate at an optimum rate without solid sulphur loss, and in which the solid bridging above the top of the apparatus is avoided.

It is another object of the invention to provide an apparatus and method for melting sulphur in which the size of the coarse solid sulphur is limited only by the size of the individual melting equipment, specifically the diameter of the tubes in which it is melted.

It is still another object of the invention to provide a sulphur melting apparatus and method, as described in the previous paragraphs, in which the control of the flow of melted sulphur from the apparatus and the prevention of the loss of solid sulphur are effectuated by an externally positioned, adjustable, heated plate onto which and from which the melted sulphur flows into a collecting trough.

It is a further object of the invention to provide portable sulphur melting equipment, as described in the previous paragraphs, which can be skid mounted so that it can be easily relocated in a sulphur storage area with gravity sulphur rundown lines connected to a permanent liquid sulphur pit.

It is a still further object of the invention to provide sulphur melting apparatus, as described in previous paragraphs, for which there is no need to crush the solid sulphur prior to feeding it into the hopper.

It is another object of the invention to provide sulphur melting apparatus, as described in the previous paragraphs, which can be brought up to full capacity operation in less than a half hour, and which can be shut down very rapidly.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes:

FIG. 1 is a plan view of a multiple sulphur melt tube assembly according to the invention, illustrating a hopper fragmentarily at the upper right end;

FIG. 2 is a fragmentary side elevational view of the sulphur melt tube assembly, taken along the lines 2—2 of FIG 1;

DESCRIPTION OF THE PREFERRED EMBODIMENT

Figure 3:
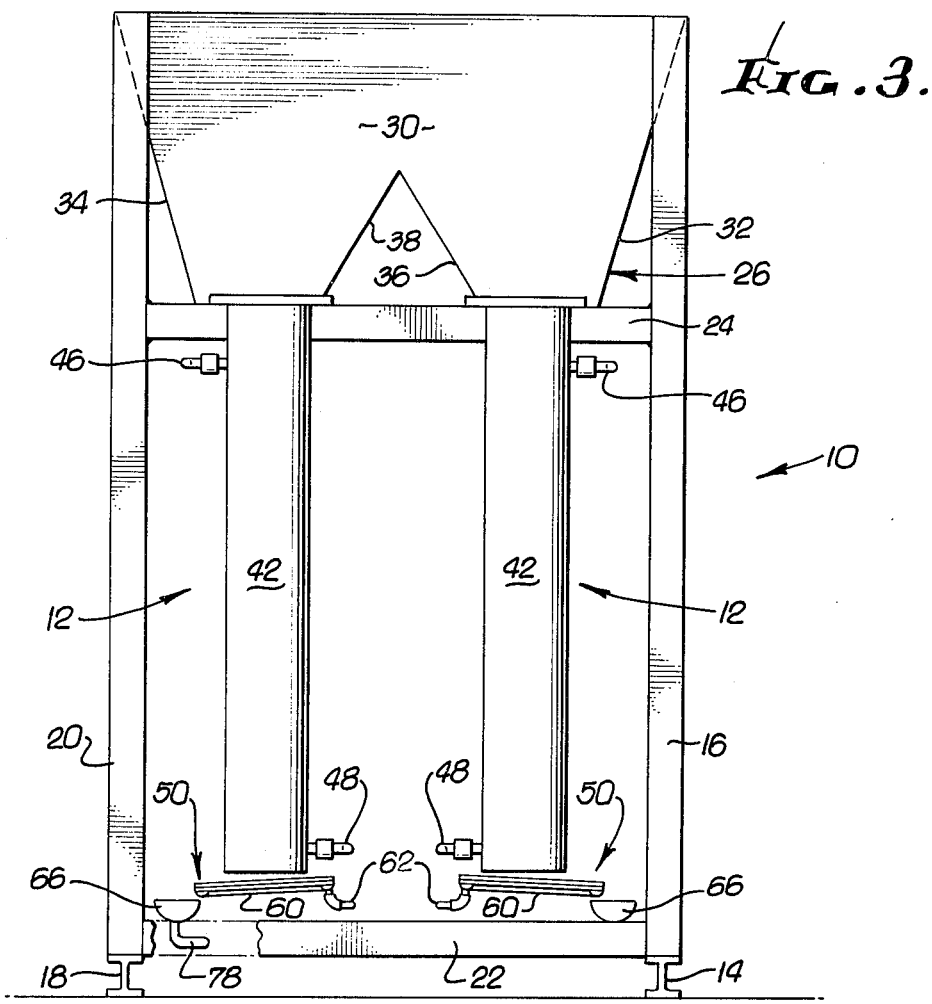
FIG. 3 is an end elevational view of the sulphur melt tube assembly, taken along the lines 3—3 of FIG. 1.
Figure 5:
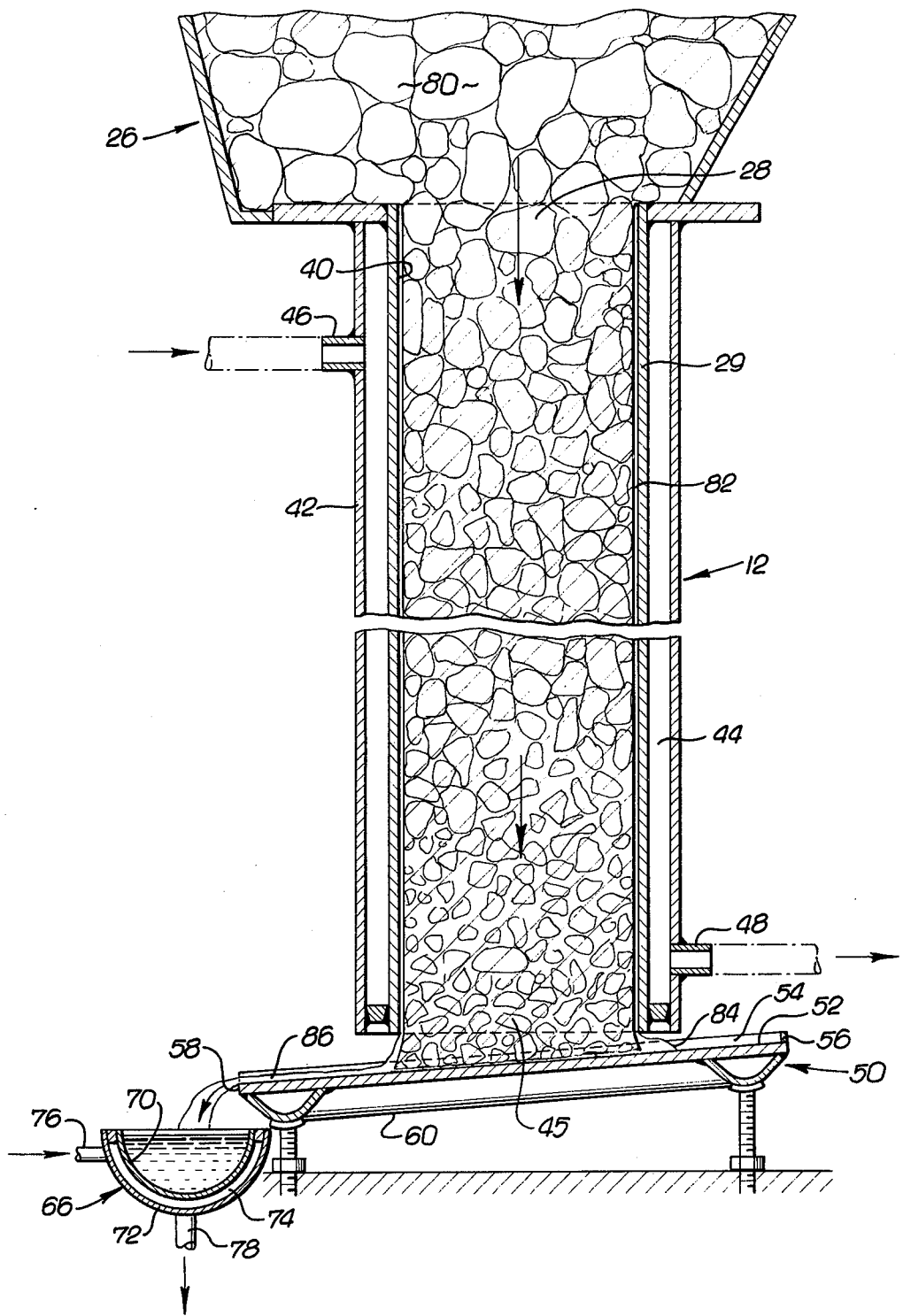
FIG. 5 is a cross-sectional view of a sulphur melt tube, taken along the lines 5—5 of FIG. 1.

Referring again to the drawings, there is shown in FIGS. 1-3 a multiple sulphur melt tube apparatus, generally designated as 10, having two rows of sulfur melt tubes 12, one tube being shown in detail in FIG. 5. The assembly is supported on a skid-type frame comprised of frame members 14, 16, 18, 20, 22 and 24. Supported at the top of frame members, as 16 and 20, and on frame member 24, is a double, gravity feeding hopper 26 from which solid sulphur flows into openings 28 at the top of each inner pipe 29 of the sulphur melt tubes 12. The hopper has end walls 30, side walls 32 and 34, and central dividing walls 36 and 38, all of which slope toward the respective inner tube openings.

As best seen in FIGS. 1 and 5, in the sulfur melt tubes 12 each cylindrical inner pipe 29 is surrounded by a cylindrical outer pipe 42. The inner pipe is open throughout its length and along its inner wall surface 40 and has an opening 45 at its lower end. Each outer pipe is sealingly secured to a respective inner pipe to form a heating jacket in an annular space 44 between the two pipes, the heating jackets having heating fluid inlets 46 and heating fluid outlets 48, the preferable heating medium being steam.

Figure 4:
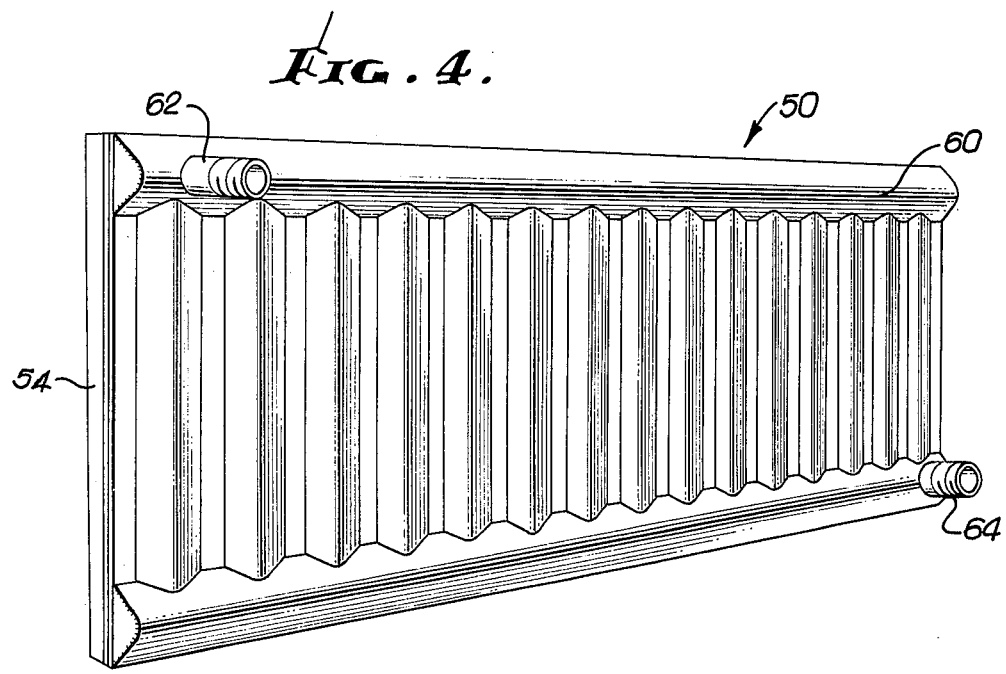
FIG. 4 is a perspective view illustrating a heating coil on the bottom of a sulphur flow control plate.

Adjustably supported beneath and spaced from the sulfur melt tubes are hot plates 50 of which, as shown in FIG. 1, there are four for the complete assembly. Each of the plates 50 is generally rectangular and has an upper flat surface 52 on which there are end rails 54 and rear rails 56 extending upwardly to prevent flow of liquified sulphur other than over the lower edges 58, the plates sloping from high points at the rails 56 to low points at the edges 58. Each of the plates, as best seen in FIGS. 4 and 5, has on its lower side a closed heating coil 60, having a heating fluid inlet 62 and a heating fluid outlet 64. The heating coil 60 serves to maintain the sulphur flowing from the heating tubes in its liquid state as it moves downwardly on the plates.

The lower edges 58 of the plates extend over downwardly sloping troughs 66, in which the liquid sulphur flows to a collecting pit or other container, not shown, out of their lower ends 68. As best seen in FIG. 5, the troughs are comprised of two spaced, half-pipes 70 and 72 forming a sealed heating space 74 therebetween. Connected to each heating space is a heating fluid inlet 76 and a heating fluid outlet 78. The troughs 66 are supported on the skid frame by members as 22, in FIG. 3.

In operation, solid sulphur 80, as shown in FIG. 5, is fed by gravity from the hopper 26 into the upper end openings 28 of the inner tubes 29. The solid sulphur fills each tube 29 and comes to rest on the surface 52 of a hot plate 50. The steam flowing through the space 44 heats inner wall surface 40 of the tube 29 so that the sulphur which is forced thereagainst immediately melts and forms a thin film 82 of liquid sulphur which flows down the wall of the tube and out of the lower end opening 45, the flow being substantially limited to along the wall surface of the tube. The liquid sulphur flows in accordance with the slope of the surface 52 with some flow as indicated at 84 being upwardly of and around the tube, but with substantially all of the flow, including that as at 84, moving downwardly as at 86 into the trough 66. The weight on the solid sulphur on the plate 52 holds it there, except that some of the sulphur directly in contact with the surface 52 melts and forms an extremely thin film which flows with the other liquified sulphur on the plate. The amount of sulphur melted on the plate is of the order of about 3%.

This operation is effectuated in part by the self-applied overburden pressure of the vertically positioned solid sulphur, it being held against the heated tube wall surface 40, so that when the thin liquid sulphur film is formed there, the equilibrium steady state condition comes into existence and remains, so long as the solid sulphur is being fed and the heat is being applied to the tube surface. Further, the resistance to the heat transfer offered by the tube wall and the thin film is very low so that when the heat is applied there is instantaneous and continuous melting to the extent of the thin film. The external and adjustable positioning of the plates 50 provide a substantial advantage in allowing the flow of the liquid sulphur film and preventing the loss of solid sulphur out of the bottom of the tubes and from the plates.

It has been found, with sulphur melt tubes having an inner diameter of 15¼ inches and a height of 10 feet, with the heating jacket having an outer diameter of 18 inches in which the tubes are made out of ⅜ inch steel, that the slope of the plates should be not less than 1 in 18 and not greater than 1 in 10, and that the high portion of the plate, directly underneath the sulphur tube should be spaced in the range of from ½ to 2 inches from the lower end of the inner tube wall, and the low portion of the plate, directly under the tube wall, should be spaced in the range of from 1½ to 3 inches from the lower end of the inner tube wall.

Where steam is used as the heating fluid, the steam pressure should be in the range of 100 to 200 lbs. per sq. inch, with temperatures of from 340° to 380° F., the sulphur melting point being 246° F. In equipment of the size indicated above, where the sulphur chunks are limited in size to that of the diameter of the inner tube, the sulphur flow rate is approximately 2 long tons per hour for each remelt tube.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example, and we do not wish to be restricted to the specific form shown or uses mentioned except as defined in the accompanying claims, wherein various portions have been separated for clarity of reading and not for emphasis.

We claim:

1. A sulfur melting apparatus comprising:
a substantially vertical tube for receiving solid sulphur at its upper end;
means for heating the inside wall of the tube so as to melt the sulphur in contact therewith;
said tube having a lower open end; and
an adjustable, heated plate externally positioned directly below the lower open end of the tube and defining a controlled restriction to prevent the flow of solid sulphur from the tube but allow the flow of molten sulphur from the tube onto the plate, said plate having a top surface with opposing end rails and a rear rail enclosing three sides of said surface, said rails extending upward above the surface of said plate, said plate extending downward from the rear rail, the lower side of said plate being fitted with a heating means.

2. The invention according to claim 1 in which:
a hopper is connected to the upper end of said tube for supplying solid sulphur thereto.

3. The invention according to claim 2 in which:
there is a sloping trough positioned below the lower edge of said plate to receive the melted sulphur therefrom.

4. The invention according to claim 2 in which:
said plate is positioned at an upper portion thereof directly below said tube in the range of from ½ to 2 inches and at a lower portion thereof is positioned directly below said tube in the range of from 1½ to 3 inches.

5. The invention according to claim 2 in which:
the slope of said plate is in range of from no less than 1 to 18 to no more than 1 to 10.

6. The invention according to claim 1 in which:
said heating means for said tube is an annular jacket around said tube having a heating fluid inlet and a heating fluid outlet.

7. The invention according to claim 3 in which:
said trough has a substantially semicircular cross section;
said trough having an external heating jacket attached thereto and said jacket having semicircular cross section complimentary to said trough; and
said heating jacket having a heating fluid inlet and a heating fluid outlet.

8. The invention according to claim 3 in which said trough has a heating means to maintain sulphur in a melted state.

9. A method for melting sulfur comprising:
feeding solid sulphur into a substantially vertical tube having open upper and lower ends;
filling the tube with solid sulphur, the solid sulphur being in direct contact with the wall of the tube;
maintaining direct contact between the top surface of an adjustable, heated plate externally positioned directly below the open lower end of the vertical tube and the solid sulfur in the tube so as to prevent the flow of the solid sulphur from the lower end of the vertical tube but allowing the flow of molten sulfur from the open lower end of the tube onto the plate, said plate having a top surface with opposing end rails and a rear rail enclosing three sides of said surface and said rails extending upward above the surface of the plate, said plate sloping downward from the rear rail; the lower side of the plate is fitted with a heating means;
heating the inside wall of the substantially vertical tube to melt the solid sulphur in direct contact with the wall; and
flowing the melted sulphur down along the inside wall of the substantially vertical tube and out of its lower end onto the plate.

10. The method according to claim 9 including:
flowing the molten sulphur from the plate into a trough positioned below said plate.

11. The invention according to claim 8 including:
a plurality of said tubes and each connected at its upper end to said hopper to receive solid sulphur therefrom;
said plate extending under the lower ends of each of said tubes to receive said melted sulphur and to prevent the flow of said solid sulphur;
said trough extending along said plate to receive said melted sulphur from each of said tubes.

12. The method according to claim 9 including:
heating said plate to maintain the melted sulphur thereon in its liquid state.

13. The method according to claim 12 including:
melting solid sulphur in contact with said plate.

14. The method according to claim 9 including:
adjusting the sloping plate to be in the range of from ½ to 2 inches below the lower end of the tube at a high portion of the plate and in the range of from 1½ to 3 inches below the lower end at a low portion of the plate.

15. The method according to claim 9 including:
adjusting the slope of said plate to be in the range of from no less than 1 to 18 to no more than 1 to 10.

* * * * *